Dec. 5, 1967   J. DREW   3,356,603
PROCESS OF TREATING BLOCK LIQUOR WITH AN ELECTRICAL DISCHARGE
FOR THE RECOVERY OF TALL OIL
Filed Nov. 27, 1964
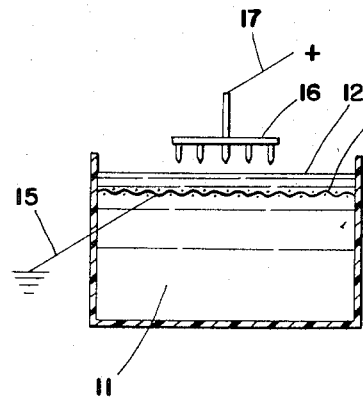
*Fig. 1*
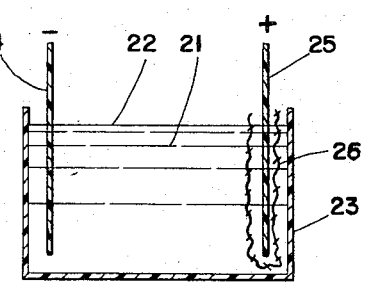
*Fig. 2*
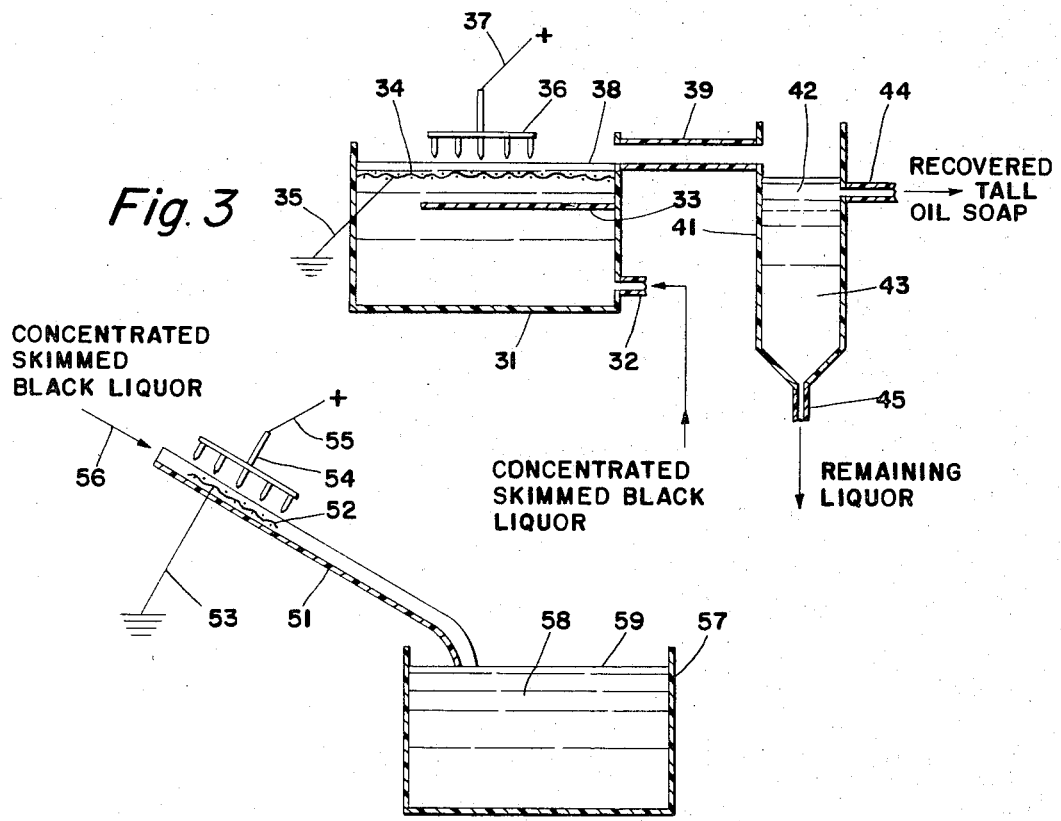
*Fig. 3*
*Fig. 4*

3,356,603
PROCESS OF TREATING BLACK LIQUOR WITH AN ELECTRICAL DISCHARGE FOR THE RECOVERY OF TALL OIL
John Drew, Jacksonville, Fla., assignor, by mesne assignments, to SCM Corporation, New York, N.Y., a corporation of New York
Filed Nov. 27, 1964, Ser. No. 414,165
8 Claims. (Cl. 204—167)

This invention relates to a process for recovering tall oil soap from black liquor, a product obtained from the pulping of resinous woods and typically that obtained from sulfate pulp digestors.

Heretofore, a fraction of easily-recoverable supernatant curdy tall oil soap has been skimmed off such black liquor mechanically, and these soap skimmings have been acidified to yield tall oil. Additional tall oil soap remains dispersed as ultrafine particles (and some probably as a solute) in the skimmed black liquor. Generally the proportion is upwards to about 20% by weight of that recovered by simple skimming. The mechanically-skimmed black liquor is concentrated in a multiple effect evaporator, then submitted to direct fire ("burned") to recover soda values. My invention makes it possible to recover additional tall oil soap instead of sacrificing it to combustion.

Broadly my process comprises subjecting a body of such black liquor to an electrical discharge, thereby inducing agglomeration of said soap, accumulating agglomerated soap as the supernatant layer on remaining liquor phase, and physically separating said supernatant layer from said remaining liquor.

The drawings show schematically in cross sectional elevation several apparatus for practicing my invention, wherein FIG. 1 illustrates schematically one system for carrying out the process of the present invention;

FIG. 2 illustrates schematically an embodiment of another system for carrying out said process;

FIG. 3 illustrates schematically an embodiment of a system adapted to carry out said process continuously; and FIG. 4 illustrates schematically an embodiment of still another system for carrying out said process.

These embodiments are described in detail below in connection with exemplary operations conducted according to invention principles.

In the first figure item 11 describes a body of concentrated skimmed black liquor from sulfate pulping, the liquor taken after several effects of a multiple effect evaporator, said concentrated skimmed black liquor containing about 25% sodium sulfate. The surface of the liquor is represented by line 12, and the body of the liquor is contained in an electrically-insulating container 13. Slightly below the surface of the liquor is metal screen 14, grounded by electrical lead 15. Positioned in atmosphere slightly above surface 12 is electrode assembly 16, charged positively by direct current brought in by electrical lead 17 from an external source not shown. Electrode assembly 16 is adapted to produce a corona wind discharge directed against the surface of the liquor and is representative of those hereinafter described. The assembly contains a large number of pointed electrodes directed towards the liquor surface. When voltage of 30,000 volts is applied to the discharge electrode assembly and the liquor surface is contacted with the resulting corona wind for several minutes, tall oil soap begins to agglomerate and to float to liquid level 12 in the form of mechanically-recoverable, supernatant curdy material. This material can be skimmed off the surface of the remaining liquor or otherwise conventionally separated therefrom. Acidification of the recovered soap will yield tall oil.

FIG. 2 shows a tank made of electrically-insulating material 23. It contains the same kind of concentrated, skimmed black liquor 21 as shown above and has liquid level 22. Immersed in liquid body 21 are a metal plate cathode 24 and a metal plate anode 25. The anode is surrounded by porous, non-conducting, stiff cloth mesh bag 26 for providing a defined collection zone. Direct current of one volt is impressed on the body between anode and cathode from an external source not shown. Curdy tall oil soap begins to accumulate in the anode zone and float to the top of the liquid layer, primarily within the confines of bag 26. Agglomerated soap that collects can be drawn off with a nonconducting aspirator tube, not shown, inserted into the anode zone at about the liquid level, and the so-withdrawn material settled by gravity in another vessel for sharper physical separation from entrained remaining liquor.

FIG. 3 represents a continuous adaptation of my process. Concentrated skimmed black liquor like that described in connection with FIGURE 1 is pumped slowly into tank 31 through inlet 32. The tank is equipped with a horizontal baffle 33, metal screen 34 grounded by electrical lead 35, corona wind discharge assembly 36 in atmosphere above liquid level 38. Electrode assembly 36 is charged positively by direct current being introduced from an external source through electrical lead 37. Decanting conduit 39 connects tank 31 to settler 41. The voltage applied at the discharge electrode assembly is 30,000 volts, and it generates a corona wind discharge. This causes agglomeration of finely dispersed tall oil soap in black liquor in the vicinity of electrode 34. The feed, pumped in through inlet 32, passes below baffle 33, then above the baffle and across the zone containing screen 34. Resulting agglomerated soap and remaining liquor overflow tank 31 through conduit 39 into gravity separator 41. Here the agglomerated soap skimmings accumulate into a substantial supernatant phase 42 which gradually is withdrawn through product outlet 44 as recovered soap. Remaining liquor thus denuded accumulates as phase 43 and is withdrawn through outlet 45.

If additional electrical treatment is warranted for recovering more soap from the remaining liquor, some or all of the remaining liquor can be recycled, optionally with fresh feed, into inlet 32. The withdrawals through outlets 44 and 45 are substantially balanced with input through inlet 32 by conventional control devices. Alternatively, part or all of the remaining liquor being withdrawn through outlet 45 can be passed into a tank like that shown in FIG. 2 for a second stage agglomeration of residual dispersed soap by similar direct current treatment of the remaining liquor in contact with an anode and a cathode. Broadly, a plurality of corona and/or bath discharge treatments can be used in series or parallel flow, if desired.

FIG. 4 shows another adaptation of my process. Item 51 is an open channel of electrically-insulating material leading into skimming basin 57, also built of electrically-insulating material. A short section of the channel near its left end is equipped on the bottom with a metal screen 52, grounded by electrical lead 53. Corona wind discharge electrode assembly 54, similar to that of FIGURE 1, is disposed in the atmosphere above the screen. It is connected by electrical lead 55 to a direct current power source not shown. A flow of concentrated, skimmed black liquor like that shown with respect to FIGURE 1 flows down channel 51 slowly and barely covers screen 52, while corona wind discharge at 30,000 volts is maintained above and directed toward the surface of the flowing black liquor. Finely dispersed tall oil soap particles begin to agglomerate and pass with remaining liquor down channel 51 into skimming basin 57. Agglomerated soap accumulates on surface 59 of the skimming basin and is withdrawn therefrom over weir means not shown. Remaining liquor phase 58 collects at the bottom of the basin and is also withdrawn from an outlet not shown. The input to and withdrawals from the skimming basin are balanced to establish and maintain essentially constant level of materials in the basin.

While my process is particularly adapted to recovery of finely dispersed tall oil soap from previously skimmed and somewhat concentrated black liquor, it is also useful for accelerating and enhancing tall oil soap recovery from unskimmed or partially skimmed black liquor. For efficiency and economy the skimmed black liquor feed for my process is concentrated by evaporation to about 20–30% salt content.

When the corona wind discharge is used, voltage from about 10,000 to about 100,000 volts is possible. The current flow is very low, ordinarily measured in fractions of a milliampere. The distance between the points of the discharge electrodes and the black liquor surface can be adjusted from about one-fourth inch to several inches, and generally will be increased as voltage is increased. The number of pointed discharge electrodes in the electrode assembly determines the intensity of the corona discharge. They can be spaced quite closely together. Preferably they are of a corrosion resisting metal such as austenitic stainless steel unless the atmosphere above the black liquor is maintained substantially oxygen-free, e.g., by purging with nitrogen or other inert gas and so shrouding such electrode assembly. Similarly the depth of the opposite electrode, e.g., the submerged screen or plate, can be from about one-sixteenth of an inch below the black liquor surface down to an inch or more, generally the higher the voltage, the deeper is such opposite electrode. Broadly, the electrodes are adjusted in distance and in voltage to avoid short-circuiting. While the above examples show the corona discharge electrode assemblies being charged positively and the opposite electrodes being charged negatively with respect to each other, reverse polarity and even alternating polarity can be used.

While it obviously is desirable to have fresh surfaces exposed to the corona wind in the process, I prefer to avoid at any stage of the process a great deal of turbulence and agitation which might tend to disperse a substantial fraction of the soap agglomerates in ultrafine condition.

When direct current electrodes are immersed into the body of the black liquor for my purpose, they are preferably resistant to sulfate corrosion. The voltage used in such instance advantageously is below the decomposition potential of water (about 1.5 volts) so that oxygen is not liberated at the anode and hydrogen at the cathode. Substantially higher voltages are generally wasteful of power and can cause polarization of the electrodes in apparatus like that shown in FIGURE 2. This form of electrical treatment is particularly good for agglomerating and concentrating residual tall oil soap still in the remaining liquor partially depleted from prior corona discharge treatment because electrophoresis, electroendosmosis, and, possibly, electrolysis can be occurring. While some soluble soap present in the black liquor probably can be recovered in my process, the ultrafine particulate soap appears to be the most readily recoverable.

I claim:

1. A process for recovering tall oil soap from sulfate pulping black liquor which comprises subjecting a body of said black liquor to an electrical discharge, thereby inducing agglomeration of said soap, accumulating agglomerated soap as a supernatant layer on the remaining liquor phase, and physically separating said supernatant layer from said remaining liquor phase.

2. The process of claim 1 wherein said black liquor has been skimmed of soap and concentrated by evaporation prior to said electrical treatment.

3. The process of claim 2 wherein said electrical discharge is a corona discharge maintained in the atmosphere above the surface of said black liquor.

4. The process of claim 3 wherein the corona discharge treatment is performed in a first zone, and the resulting fluent suspension is passed to a second zone for accumulation of said supernatant soap layer.

5. The process of claim 4 wherein at least a portion of said remaining liquor phase is recycled from said second zone to said first zone for additional electrical treatment.

6. The process of claim 1 wherein direct current is impressed through said body of black liquor from an anode to a cathode, both in contact with said body, and resulting agglomerated soap concentrates in the vicinity of the anode for withdrawal therefrom.

7. The process of claim 6 wherein the voltage impressed across said body from anode to cathode is below the decomposition potential of water.

8. The process of claim 4 wherein said remaining liquor phase is subjected to direct current treatment in contact with an anode and a cathode for second stage agglomeration of residual dispersed soap, and the resulting second stage agglomerated soap is withdrawn from the vicinity of said anode.

References Cited

UNITED STATES PATENTS 2,814,360  11/1957  Beaver _____ 162—29

FOREIGN PATENTS 4,685  1897  Great Britain.
791,776  3/1958  Great Britain.

JOHN H. MACK, *Primary Examiner.*

ROBERT K. MIHALEK, *Assistant Examiner.*